J. W. Hodges,
Horseshoe.
N° 70,091.   Patented Oct. 22, 1867.

United States Patent Office.

J. WILSON HODGES, OF BALTIMORE, MARYLAND.

Letters Patent No. 70,091, dated October 22, 1867.

---

IMPROVEMENT IN HORSE-SHOES.

---

*The Schedule referred to in these Letters Patent and making part of the same.*

---

TO ALL WHOM IT MAY CONCERN:

Be it known that I, J. WILSON HODGES, of the city and county of Baltimore, and State of Maryland, have invented a new and useful Improvement in Horse-Shoes; and I do hereby declare the following to be a full and exact description of the same, reference being had to the accompanying drawings, which are made a part of this specification, and in which—

Similar letters of reference indicate corresponding parts in the two figures.

Figure 1:
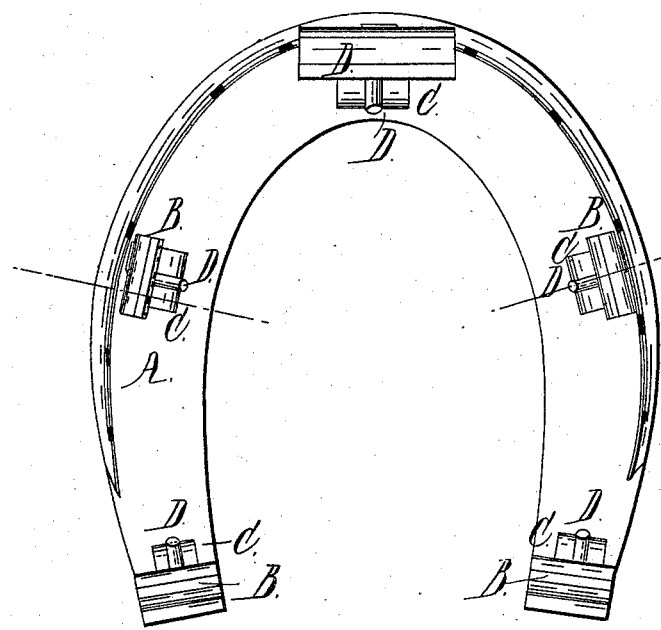
Figure 1 is an under side plan view of a horse-shoe with my invention applied.
Figure 2:
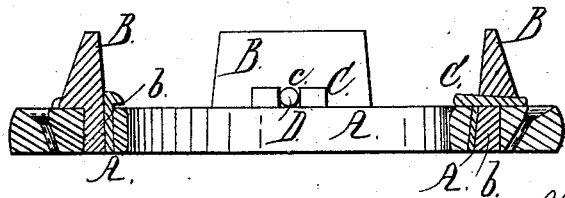
Figure 2 is a section thereof in the plane indicated by the line $x \; x$

The object of my invention is to provide a secure and cheap method of securing roughing-calks to horse-shoes, and at the same time avoid the employment of the screw in so doing. In fastening separate roughing-calks by the method heretofore most commonly practised, screws are employed; and as the calks are now made with a view to temporary attachment, the use of screws is objectionable on account of the fact that when the shoe is submitted to the action of fire subsequently to the first application of the calks, the screws become loose by reason of the unequal effect which is produced upon the threads thereof by heat and hammering, permanently unfitting the attaching devices for further use.

My invention consists in attaching the calk by means of a wedge and pin, which not only afford greater security, but are adapted to be retightened and adjusted as often as the shoe may be subjected to the fire. The wedges and calks have shoulders to prevent them being driven in far enough to come in contact with the horse's hoof.

In order that others skilled in the art to which my invention appertains may be enabled to fully understand and use the same, I will proceed to describe it in detail.

A may represent a horse-shoe, and B the metallic calks thereof. Each calk is formed with a shank, $b$, which may be slightly tapered, and which is inserted into a corresponding but somewhat larger aperture, $A'$, punched in the shoe to receive it. C is a metallic wedge, which is driven into the aperture $A'$, alongside of the shank $b$, for the purpose of holding the calk securely in the shoe. Now it is manifest that so long as the shank $b$ and wedge C are prevented from moving independently of each other, the calk must remain securely and immovably in place. To prevent this independent movement, and hence to obtain a very secure means of attachment, I form the head $C'$ of the wedge C with a recess, $c$, for the accommodation of the projecting straight portion of a pin, D, which, being inserted transversely through the calk B, is bent at one end to prevent it working out in one direction, while its displacement in the opposite direction is prevented by enlargement or otherwise. The pin D thus applied holds the wedge in an immovable position relatively to the calk. The wedge should not be driven in to the full extent, as it is designed to be further driven as often as it may be necessary to retighten.

It is obvious that the calks may be applied, as above described, to an over-shoe, or a plate which is applied temporarily to the ordinary shoe. Also that the extremity of the shank of the calk may be formed with a small lip or projection to overlap the under edge of the aperture A, and thus accomplish the same end as the tapering of the shank.

Having thus described my invention, what I claim as new herein, and desire to secure by Letters Patent, is—

The combination with the calk B $b$, as a means for attaching the same to the shoe, of the wedge C and pin $d$, substantially as described.

J. WILSON HODGES.

Witnesses:
SOLON C. KEMON,
CHARLES A. PETTIT.